Patented Apr. 9, 1940

2,196,344

UNITED STATES PATENT OFFICE 2,196,344

MANUFACTURE OF TANNING SUBSTANCES

Josef Schäfer, Riehen, near Basel, and Robert Biedermann, Basel, Switzerland, assignors to the firm of J. R. Geigy A. G., Basel, Switzerland No Drawing. Application December 5, 1938, Serial No. 244,129. In Switzerland December 6, 1937

2 Claims. (Cl. 260—49)

This invention relates to the manufacture of condensation products having a tanning action, and has for its object to produce in a simple manner products having excellent tanning properties, and which are readily soluble in water.

It has heretofore been proposed, for the purpose of obtaining tanning agents, to heat phenol mono-sulphonic acid with naphthalene mono-sulphonic acid to temperatures of about 140° C. These condensation products however are only slightly soluble in water, for which reason they must be subjected to a subsequent treatment with sulphuric acid. The sulphonated condensation products possess only a slight tanning action so that it is not possible to produce a marketable leather therewith.

According to the present invention a somewhat similar condensation process is used, starting with crude sulphonated mixtures of naphthalene and phenol, or with the isolated phenol and naphthalene mono-sulphonic acids themselves, but higher temperatures are employed, whereby condensation products are obtained which are easily soluble in water and possess excellent tanning properties in solutions which are Congo acid or litmus acid. For the new process the temperature for the condensation reaction must be above 140° C., preferably at about 170° C., as below this condensation is too slow, and above, for example at 190° to 200° C., products are obtained which become darker as the temperature increases; moreover constant removal of the reaction water is essential, and this can be effected on a large scale by means of an air stream or by reducing the pressure in a closed reaction vessel.

The proportion of naphthalene mono-sulphonic acid to phenol mono-sulphonic acid may vary within wide limits; a higher proportion of phenol sulphonic acid has proved to be of advantage as the tanning properties of the final product are thereby increased.

Tanning agents with particularly good properties are obtained according to the following example, the parts being by weight:

Example 400 parts of naphthalene mono-sulphonic acid produced by heating for a number of hours equal parts of naphthalene and sulphuric acid monohydrate to 130–140° C., and 400 parts of phenol mono-sulphonic acid, produced in the usual manner from equal parts of phenol and sulphuric acid monohydrate at 100–105° C., are heated for 24 hours in a vacuum to 168–170° C. The final product in the cold is a hard resilient resin. Its tanning properties are excellent.

When air is conducted through the reaction mixture there are obtained somewhat darker colored products which however possess the same excellent tanning properties.

What we claim is:

1. In the production of synthetic tans made by condensing phenol monosulphonic and naphthalene monosulphonic acid, the improvement of causing phenol monosulphonic acid to react upon naphthalene monosulphonic acid at about 170° C. under reduced pressure.

2. Synthetic tans being hard resilient resins, easily soluble in water, possessing excellent tanning properties in solutions acid to Congo and litmus, being obtainable according to the process claimed in claim 1.

JOSEF SCHÄFER.
ROBERT BIEDERMANN.